United States Patent [19]

Wallace

[11] Patent Number: 4,597,595
[45] Date of Patent: Jul. 1, 1986

[54] SWIVEL-LESS COUPLING APPARATUS

[75] Inventor: Norman R. Wallace, Walnut Creek, Calif.

[73] Assignee: Bechtel International Corporation, San Francisco, Calif.

[21] Appl. No.: 705,778

[22] Filed: Feb. 26, 1985

[51] Int. Cl.$^4$ .............................................. F16L 55/00
[52] U.S. Cl. .................................. 285/119; 285/272; 285/912; 141/387; 441/4
[58] Field of Search ............... 285/119, 272, DIG. 13; 405/169, 170, 171; 166/359, 367; 441/4; 141/387

[56] References Cited

U.S. PATENT DOCUMENTS

| | | | |
|---|---|---|---|
| 418,053 | 12/1889 | Pelkey | 285/272 X |
| 2,299,521 | 10/1942 | Zierden | 285/272 X |
| 3,909,047 | 9/1975 | Salmela | 285/119 |
| 4,299,262 | 11/1981 | Andrepont | 141/387 |
| 4,457,728 | 7/1984 | Brown | 441/4 |

FOREIGN PATENT DOCUMENTS 867988 5/1961 United Kingdom ................ 285/272

OTHER PUBLICATIONS

Transfer System Uses No Swivels, Offshore, May 1985, p. 204.

Primary Examiner—Dave W. Arola
Attorney, Agent, or Firm—Townsend and Townsend

[57] ABSTRACT

An improved apparatus for coupling a fixed unit, such as a fluid riser or electrical cable rising from a sea bed and fixed in space, with a movable unit, such as a production vessel floating on the prevailing sea. The apparatus includes a pair of vertically spaced, coaxial, relatively shiftable disks, the lower disk being coupled with the riser or cable, and the upper disk being coupled with the vessel. A conduit extends between and can be moved onto and off the members as a function of the rotation of the vessel due to the wave action. The upper and lower members move in a manner to allow the conduit to move onto the circumferential extent of the outer periphery of one member and off the circumferential extent of the outer periphery of the other member as a function of the rotation of the vessel through at least two revolutions in one direction.

16 Claims, 11 Drawing Figures

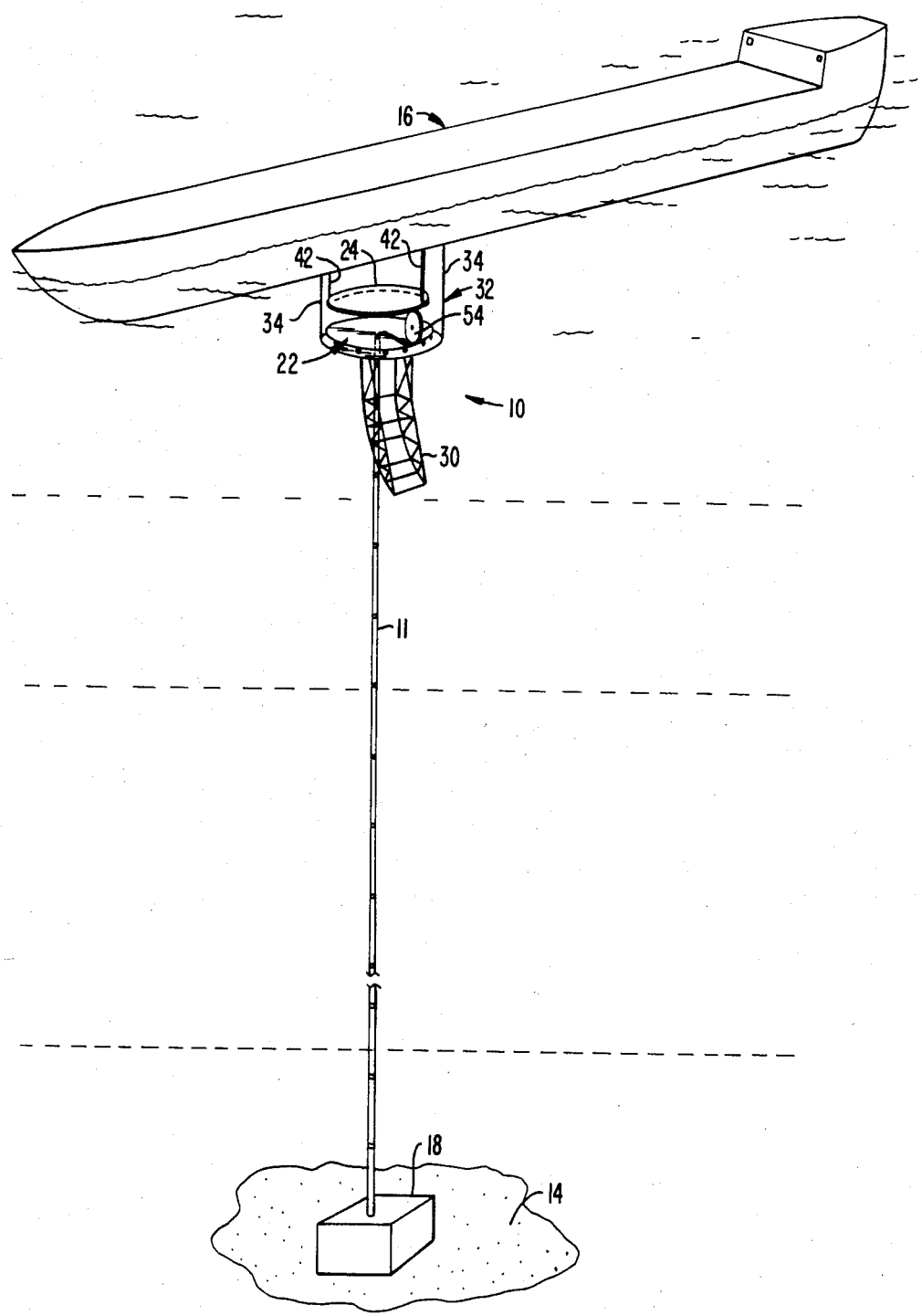
FIG._1.

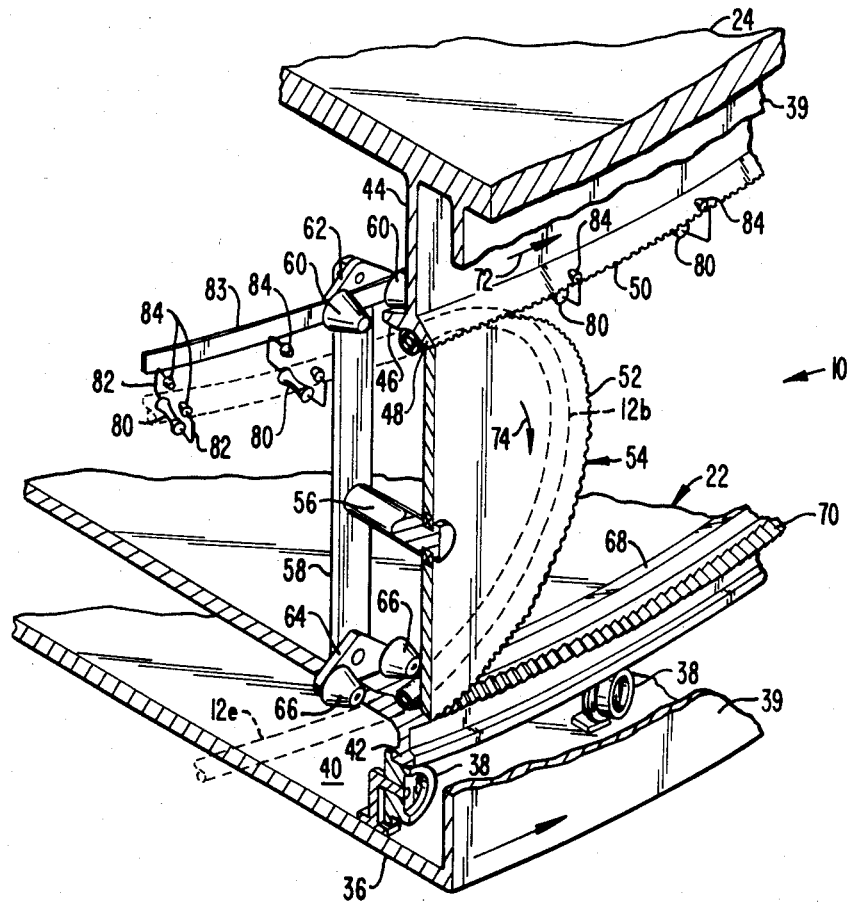
FIG._2.
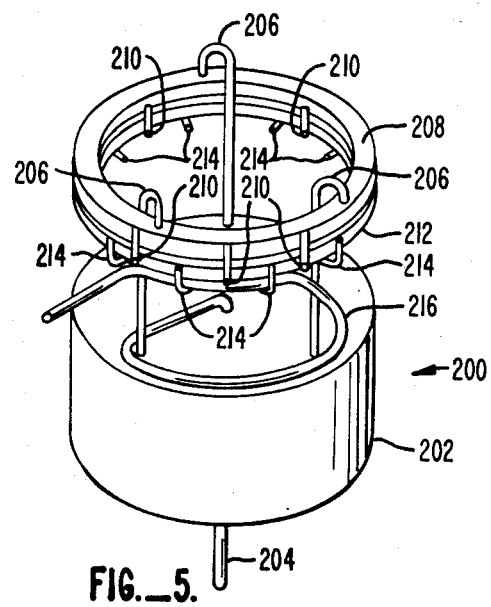
FIG._5.

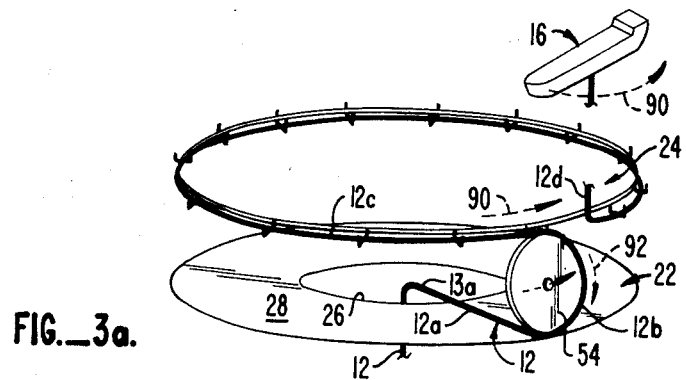
FIG._3a.
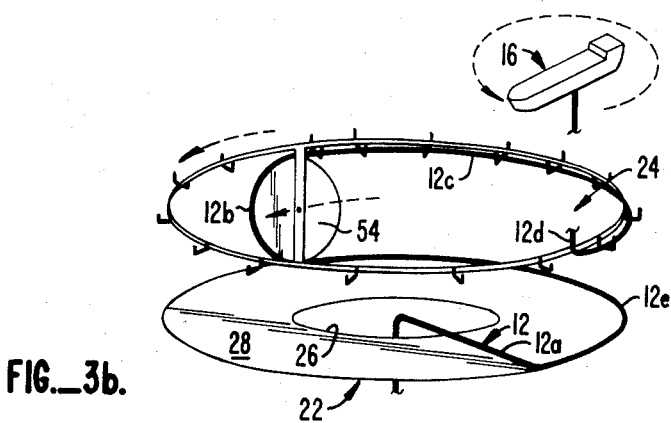
FIG._3b.
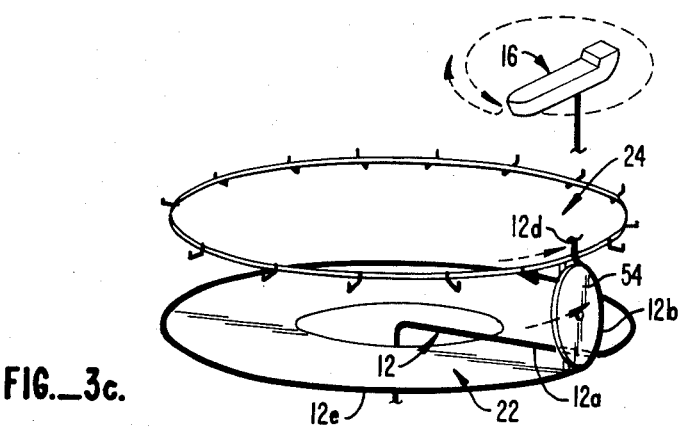
FIG._3c.

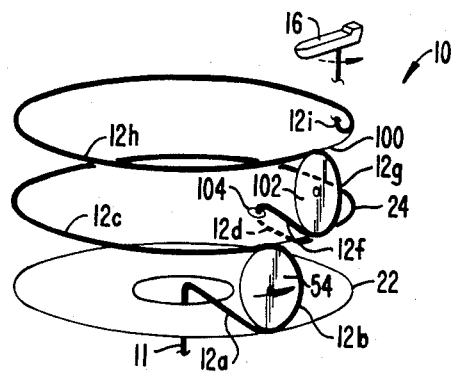
FIG._4a.
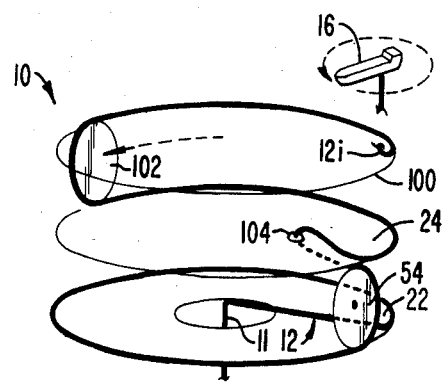
FIG._4d.
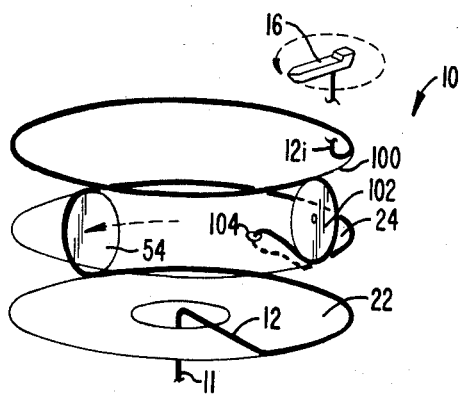
FIG._4b.
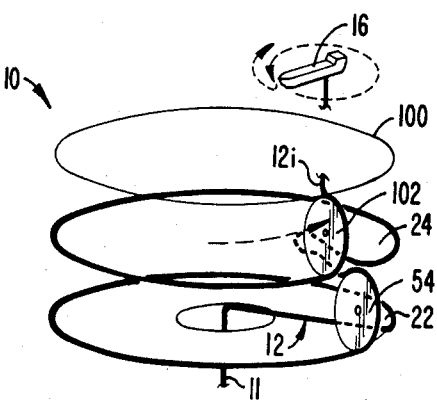
FIG._4e.
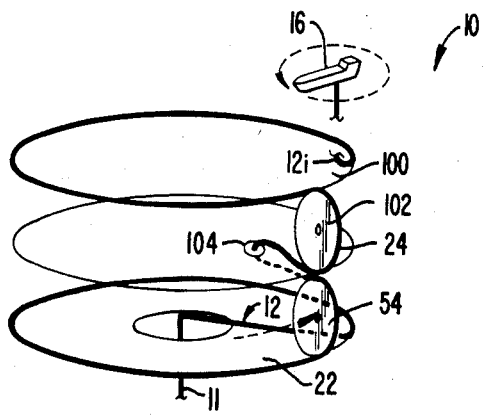
FIG._4c.

SWIVEL-LESS COUPLING APPARATUS

BACKGROUND OF THE INVENTION

In offshore oil and natural gas production, hydrocarbons are delivered by tubular risers from wells on the sea bed to a ship or floating production vessel, the hydrocarbons being directed into a hold of the vessel. When the hold is filled, the vessel is typically uncoupled from the riser and moved toward a transfer location near onshore storage tanks or ground transportation facilities. Since the vessel, when coupled with the riser, will align its fore and aft axis normal to the wave fronts of the prevailing sea, provision must be made to allow for rotation of the vessel about a vertical axis relative to the riser connection. This is required because produced hydrocarbon fluids must be transferred from the riser to the hold of the vessel, which is continuously rotating with respect to the riser due to the wave action of the sea.

Swivels are normally used as a rotating link between the riser and the vessel. These swivels require a seal and generally are under mechanical stresses at all times. The seal integrity and mechanical stresses are troublesome factors, especially in high pressure transfer of the hydrocarbon fluids from the riser to the vessel. Hose or flexible steel piping with rigid, non-sliding pressure-tight connections would be preferred to a swivel with its rotating seals. However, flexible pipe systems, unlike swivels, can only rotate a few degrees in one direction.

In the prior art, there are numerous types of flexible connector devices which allow limited rotatability in either direction. Such devices usually permit rotation up to a small fraction of an arc in either direction. Mechanical and geometrical problems arise in handling the free loops of flexible pipe in the intermediate position between extreme clockwise and extreme counterclockwise rotation. "Maypole" or "Soap Box Steering" configurations of the flexible pipe compound these problems with both tension and torsion loads on the flexible pipe.

Because of the problems associated with conventional connector structures between a fluid riser and a floating vessel which receives fluid from the riser, a need exists for improvements in mechanically coupling such a riser to a movable vessel. The present invention satisfies this need by providing a swivel-less apparatus to provide the coupling between the riser and the vessel as hereinafter described.

SUMMARY OF THE INVENTION

The apparatus of the present invention includes a pair of vertically spaced, relatively rotatable members which are preferably in the form of disks coaxial with each other. The lower member is coupled to the riser, and the upper member is coupled to and moves with a movable support, such as a vessel floating on the prevailing sea. The riser may be a flexible steel pipe, a flexible hose, or a flexible electrical cable.

A conduit segment coupled to the upper end of the riser or being part of the riser is carried by the apparatus and moves onto and off the members as the members rotate relative to each other in opposite directions through arcs greater than 360°, such as two complete revolutions or more. The conduit passes about a semicircular part of a disk-like element which rotates about an axis transverse to the axis of the rotation of the members relative to each other. Also, the element moves about the common axis of the members in rolling relationship thereto. As the element moves in one direction about such common axis, the conduit segment is moved off the lower member and onto the upper member. Conversely, as the element moves in the opposite direction about such common axis, the conduit segment is moved off the upper member and onto the lower member. Thus, by making the conduit segment sufficiently long and the members sufficiently large, the support can be allowed to rotate in one direction through arcs greater than 360°, such as two or more complete revolutions, before the support must be reversed. This aim can be achieved without conventional swivels, seals and the like.

Typically, the conduit segment is supported on the lower member by being laid on the upper surface of the member, and the conduit segment is supported on the upper member by spaced support devices near the lower surface of the upper member. As the upper member rotates relative to the lower member, the rotatable element rotates around the central axis of the members near the outer peripheries of the members. For purposes of illustration, as the upper member moves about its central axis through one revolution relative to the lower member, the element will have progressed in a corresponding direction through one-half revolution about such central axis. As the upper member moves through the second revolution, the element will complete one full revolution about the central axis and the conduit segment will be fully laid out on one of the members. Reversing the direction of rotation of the members causes the conduit segment to be laid out on the other member after rotation of the members relative to each other through two revolutions. In the process, the inlet and outlet of the conduit segment will have rotated two full revolutions relative to each other.

Multiple conduit segments can be arranged between the same two members by laying the conduit segments on the members in concentric paths on the members. Moreover, more than two revolutions of the inlet and outlet of the conduit may be achieved by providing more than a pair of members vertically stacked with respect to each other, all of the members except the lower member being rotative relative to the riser or conduit to which a movable support is to be coupled.

The primary object of the present invention is to provide an improved apparatus for coupling a conduit to a support moveable relative to and about the conduit to permit the support to move through a relatively long arcuate distance in either of a pair of opposed directions to avoid the need for swivels and other limiting devices whereby the apparatus is suitable for a number of different applications, including use in transferring fluid hydrocarbons from a seabed through a fluid riser to a vessel floating on the prevailing sea.

Other objects of this invention will become apparent as the following specification progresses, reference being had to the accompanying drawings for an illustration of the invention.

IN THE DRAWINGS

FIG. 1 is a schematic view, in perspective, of the apparatus of the present invention as used for coupling a riser or conduit to a vessel floating on the prevailing sea;

FIG. 2 is an enlarged, perspective cross-sectional view of the apparatus;

FIGS. 3a, 3b and 3c show schematic views of the apparatus to illustrate the sequence of its operations in allowing the vessel of FIG. 1 to rotate in either of a pair of opposed directions through an arc of two full revolutions relative to the riser or conduit; and FIGS. 4a, 4b, 4c, 4d, and 4e are views similar to FIGS. 3a, 3b and 3c but showing another form of the apparatus in schematic form in which the apparatus allows more than two full revolutions of the vessel of FIG. 1 relative to the conduit.

FIG. 5 is a perspective view of another form of the apparatus used for coupling a riser to a body.

The swivel-less coupling apparatus of the present invention is broadly denoted by the numeral 10 and, for purposes of illustration, is shown in FIG. 1 as being used to couple a riser or conduit 11 extending upwardly from a sea bed 14 to a movable support, such as a vessel or tanker 16 floating on the prevailing sea. For purposes of illustration, riser 11 is a fluid conduit, such as a steep pipe or hose, for allowing liquid or gaseous hydrocarbons or other minerals to flow from a terminal 18 coupled in some suitable manner to oil or gas wells drilled into the sea bed 14. However, riser 11 could be an electrical cable, if desired. The apparatus 10 will hereinafter be considered as the coupling means between a fluid riser 11 and the fluid handling facilities of a sea going tanker or vessel which can receive hydrocarbon fluids in its hold and transport such fluids over long distances to onshore installations for storage or for refining.

Apparatus 10 includes a pair of vertically spaced members 22 and 24 which typically are in the form of disks of substantially the same outer diameter and substantially coaxial with each other along a central axis. The lower member 22 is coupled with the upper end of riser 11, and a flexible conduit 12 has an inlet end coupled to or integral with the upper end of riser 11. Conduit segment 12 has a flexible segment 12a (FIGS. 1, 3a, 3b and 3c), the riser 11 extending through the center hole 26 of lower member 22. Segment 12a of the conduit 12 is substantially fixed in some suitable manner, such as by one or more brackets 13 (FIG. 3A), to the upper surface 28 of the lower member 22. Lower member 22 can be considered fixed in space relative to the upper end of riser 11 and relative to vessel 16. A moment limiting frame 30 (FIG. 1) is coupled to and extends downwardly from the bottom of lower member 22. Frame 30 is coupled in a conventional manner to riser 11 at the upper end of the riser. In addition to frame 30, lower member 22 may be provided with riser tensioners (not shown) and mooring winches (not shown). If a plurality of risers are directed upwardly from sea bed 14, the risers may be coupled to a piping manifold (not shown) mounted on the upper surface of lower member 22 for commingling purposes.

To support the weight of lower member 22, vessel 16 is provided with a frame broadly denoted by the numeral 32 which includes a number of vertical posts 34 secured to the underside of vessel 16 and extending downwardly therefrom. A support ring 36 is secured at circumferentially spaced locations thereon to the lower ends of posts 34, and plate 36 has a number of spaced, flanged rollers 38 on the upper surface 40 thereof (FIG. 2) for engaging and thereby supporting an annular rail 42 on the lower outer peripheral margin of lower member 22 as shown in FIG. 2. Thus, plate 36 can rotate with vessel 16 about the central axis of lower member 22 as the fore and aft axis of the vessel is aligned by wave action to normal to the wave fronts of the prevailing sea.

The upper member 24 is coupled by circumferentially spaced posts 42 (FIG. 1) to the lower part of vessel 16 so that member 24 will be in a plane substantially parallel to the plane of member 22 and coxially aligned with member 22. In the alternative, a wall 39 (FIG. 2) can connect plate 36 with upper member 24 so that upper member 24 will be coupled by posts 34 to the vessel. By virtue of the connection between upper member 24 and vessel 16, upper member 24 will rotate with vessel 16 relative to and about the central axis of lower member 22.

Upper member 24 has a rigid, annular skirt 44 (FIG. 2) which extends downwardly therefrom near the outer periphery thereof. Skirt 44 has a pair of sloping side flanges 46 and 48, flange 48 being a ring gear having a plurality of teeth 50 for meshing with the outer teeth 52 of a rolling element or gear wheel 54 having a central stub shaft 56 carried by a hanger element 58 provided with a pair of beveled upper rollers 60 on a bracket 62 at the upper end of element 58 as shown in FIG. 2. The lower end of element 58 has a bracket 64 provided with beveled lower rollers 66 which engage an inclined annular surface 68 on the outer peripheral margin of the upper surface of lower member 22. A set of ring gear teeth 70 on the outer margin of lower member 22 also is in mesh with the teeth 52 of gear wheel 54. Thus, gear wheel 54 is moveable in either of a pair of opposed directions relative to member 22 as a function of the rotation of upper member 24 relative to lower member 22. For instance, if upper member 24 moves relative to lower member 22 in the direction of arrow 72 (FIG. 2), gear wheel 54 will rotate about the axis of its stub shaft 56 in a direction of arrow 74 (FIG. 2). Similarly, if upper member 24 moves in a direction opposite to the direction of arrow 72, gear wheel 54 will rotate about its central axis in a direction opposite to the direction denoted by arrow 74.

As the gear wheel rotates in the direction of arrow 74, its stub shaft 52 will move in the same direction, namely the same direction as arrow 72, with upper member 24. Similarly, when gear wheel 54 rotates in a direction opposite to the direction indicated by arrow 74, shaft 56 will move about the central axis of lower member 22 in the opposite direction. Thus, gear wheel 54 moves as a function of the rotation of upper member 24 relative to lower member 22.

Conduit 12 has a segment 12b which is laid on the upper surface of lower member 22 as gear wheel 54 moves in one direction, namely the direction of arrow 72, with upper member 24. The reason for this is that the conduit segment 12b is carried by and on one side of gear wheel 54 by means (not shown), such as by friction-less rollers. As gear wheel 54 moves in the opposite direction, i.e. in a direction opposite to direction indicated by arrow 72, conduit 12 is lifted off the upper surface 28 of lower member 22 and is "laid on" the lower outer peripheral margin of upper member 24. While the pipe is not laid on the lower surface of member 24, the pipe is supported by circumferentially spaced rollers 80 having arms 82 on which end rollers 84 are carried, rollers 84 being carried on an annular band 83 and supported on the upper surfaces of flanges 46 and 48 (FIG. 2), conduit 12 being shown in dashed lines in FIG. 2 as being supported on a pair of such rollers 80.

In operation, apparatus 10 allows the vessel 16 to rotate two complete revolutions due to the wave action of the prevailing sea before it is necessary to actuate the ship drive means for reversing the direction of rotation of the vessel. The sequence of operation of the apparatus to achieve this result is shown in FIGS. 3a, 3b and 3c.

Assuming that conduit 12 is coupled to lower member 22, as shown in FIG. 3a and gear wheel 54 is in the position of FIG. 3a, conduit 12 will have a curved segment 12b extending around one-half the circumference of gear wheel 54 while the remaining part of conduit 12 will be in the form of segment 12c which will extend substantially about the entire outer periphery of upper member 24, the conduit having a vertical segment 12d which is adapted to be coupled to the facilities of vessel 16.

As upper member 24 rotates with vessel 16 in the direction of arrow 90 (FIG. 3a), gear wheel 54 rotates about its own axis, i.e., the axis of shaft 56, in the direction of arrow 92 and also moves about the axis of lower member 22 in the direction of arrow 94. As gear wheel 54 moves in the direction of arrow 94, it reduces the arcuate length of segment 12c and lays down conduit 12 on the upper surface 28 of lower member 22 to form a segment 12e of the conduit as shown in FIG. 3b. When the vessel and upper member 24 have rotated through a full revolution in the direction of arrow 90, gear wheel 54 will only have traveled half the distance around the axis of lower member 22. Thus, FIG. 3b illustrates the position of gear wheel 54 after a complete revolution of vessel 16 in which case, segment 12e only partially extends about one-half the outer periphery of lower member 22 while segment 12c extends about one-half the outer periphery of upper member 24. Segment 12c of conduit 12 will have moved away from the lower outer peripheral margin of upper member 24 since the segment 12c shown in FIG. 3a will have been directed around the outer peripheral portion of gear wheel 54 and been laid down to form segment 12e of FIG. 3b.

Continued rotation of vessel 16 through a second revolution in the direction of arrow 90 will cause the continued movement of gear wheel 54 in the direction of arrow 90 about the vertical axis of lower member 22. This continues until the vessel and upper member 24 have revolved through the second revolution, at which time gear wheel 54 will be almost again at its starting position with reference to lower member 22. When this occurs, all of segment 12c will have been removed from the outer peripheral margin of upper member 24, and segment 12e will increase in length to cover substantially the entire outer peripheral margin of lower member 22 as shown in FIG. 3c. At this time, to return the conduit to the initial operating condition shown in FIG. 3a, the vessel must be driven under its own power in a direction opposite to the direction indicated by arrow 90 if, for instance, the prevailing seas continue to tend to rotate the vessel in the direction of arrow 90.

As the vessel rotates as described above, fluids can be directed through conduit 12 if the riser 11 is tubular and carries fluids, such as hydrocarbons, from the sea bottom. If the riser 11 is electrical cable, electrical power can be delivered through conduit 12, which will be an electrical cable, as the upper member rotates relative to the lower member.

Thus, it is seen that apparatus 10 substitutes fixed hose, pipe or cable connections for fluid swivels and slip rings to pass fluids or electrical current through a rotatable junction with a large angular rotation permissible from one limit to another limit.

While a single riser 11 and conduit 12 have been shown and described above with respect to apparatus 10, more than one such riser and conduit can be arranged between the two members 22 and 24. This is achieved by laying the conduits on the perimeters of concentric paths within the outer peripheries of the lower and upper members 22 and 24. Such an arrangement would permit a plurality of fluids or electrical currents to be transferred between terminal 14 and vessel 16.

The teachings of the present invention can be carried out to allow for more than two revolutions of the vessel relative to lower member 22, if desired. For instance, as shown in FIGS. 4a–4e, apparatus 10 can be provided with a third member 100 above members 22 and 24 and coaxial therewith. A second gear wheel 102 is between members 24, and 100 and conduit 12 will extend along one-half the outer periphery of gear wheel 102 and about the outer periphery of member 100. To support the conduit 12 on member 100, the member will be provided with support rollers of the type indicated as rollers 80 in FIG. 2. Member 24 will be capable of rotating with member 100 relative to lower member 22, and member 100 will be capable of rotating relative to members 22 and 24 with vessel 16. Thus, member 100 will be coupled by posts, such as posts 42, to vessel 16 while member 24 will be rotatably coupled by posts or other structure (not shown) to member 100.

To illustrate the operation of apparatus 10 with the use of members 22, 24 and 100, assume that the conduit 12 is as shown in FIG. 4a with segment 12a on the upper surface 28 of lower member 22 radial to the central axis of member 22. Segment 12b will be along one-half the outer periphery of gear wheel 54 while a maximum segment 12c will extend substantially about the entire outer periphery of the lower surface of member 24. A short segment 12d will extend through a hole 104 in the bottom of member 24 and then form a short segment 12f (FIG. 4a) which will then extend about segment 12g and then form segment 12h on the outer periphery of member 100. The outlet end 12i of the conduit 12 will be as shown in FIG. 4a.

During the first revolution of vessel 16, members 24 and 100 will rotate as a unit about the central axis of member 22 as shown in FIG. 4b until gear wheel 54 has traveled one-half revolution about the central axis of member 22. Gear wheel 102, without rotating about its own axis, will have traveled a full revolution since members 24 and 100 will have rotated as a unit or together about the central axis of lower member 22. Also, there will be no removal of conduit segment 12b from member 100. Continued rotation of vessel 16 through the second revolution causes gear wheel 54 to move about the periphery of member 22 back to its starting position as shown in FIG. 4c while gear wheel 102 again rotates as a unit with members 24 and 100 through a second revolution about the central axis of lower member 22. FIG. 4c illustrates the relative positions of the gear wheels and the members 22, 24 and 100 after the end of the second revolution.

Continued revolution of vessel 16 through a third revolution will cause member 100 and gear wheel 102 to rotate as a unit about the central axis of members 22 and 24 while member 24 remains stationary because it cannot rotate further relative to the lower member 22 since segment 12d passes through hole 104. Thus, gear wheel 102 will have rotated one-half revolution about the central axis of member 22 during the third revolution of vessel 16, and one-half of the conduit 12 that was on the outer periphery of member 100 will have been transferred during this third revolution to the lower surface of member 24 as shown in FIG. 4d.

As the vessel continues to rotate through a fourth revolution, gear wheel 102 will return to its initial starting position, at which time the conduit 12 will have been laid down substantially on the entire outer periphery of member 24 and will have moved away from the outer periphery of upper member 100. Then, the vessel will be required to be driven in the opposite direction through four complete revolutions to return apparatus 10 the starting condition of FIG. 4a, depending upon the condition of the prevailing sea.

While apparatus 10 has been shown for use in allowing rotation of the vessel 16 through two revolutions or four revolutions, it is clear that additional members can be stacked upon members 22, 24 and 100 to provide for rotation of the vessel through a greater number of revolutions, if desired.

FIG. 5 is a perspective view of a buoy 200 having a lower base 202 fixed in space to the upper end of a riser 204. The base 202 is secured by legs 206 to a ring 208 having depending bearings 210 for rotatably supporting a ring 212 having support devices 214 for supporting a conduit 216 coupled to the riser. Thus, the conduit 216 can allow the rotation of ring 212 through two revolutions relative to base 202 before the ring must be reversed.

I claim:

1. Apparatus for coupling a relatively fixed conduit to a rotatable support comprising:
   a pair of vertically spaced members means coupling the members together to allow the upper member to be rotatable relative to the lower member about a first, generally vertical axis; means coupled with said upper member for connecting the latter to said support to permit the upper member to rotate with the support relative to the lower member;
   a roller element; means rotatably coupling the roller element to said members, said roller element being between and rotatable relative to the members about a second axis transverse to the first axis as a function of the rotation of the members relative to each other; and
   a flexible conduit segment extending between the members and partially about said element and movable into positions adjacent to the members, the conduit segment having a first end coupled to the lower member and adapted to be coupled to the fixed conduit and a second end adapted to be coupled to support, each of the members having means for defining a conduit support surface thereon, said conduit segment being movable onto the support surface of the lower member and off the support surface of the upper member as the roller element moves about said first axis in one direction, said conduit segment being movable off the support surface of the lower member and onto the upper member as the roller element moves about said first axis in the opposite direction, the length of the conduit segment being sufficient to allow the upper member and the lower member to rotate about said first axis in either direction through an arc greater than 360°.

2. Apparatus as set forth in claim 1, wherein the members and said element have circular outer peripheries, said element coupling means comprising gear structure at the outer peripheries of the members and element for coupling said element to the members for rolling movement related thereto about the first axis.

3. Apparatus as set forth in claim 1, wherein said element coupling means includes a gear means between the element and the upper member for causing rotation and translation of the element relative to the lower member as a function of the movement of the upper member relative to the lower member.

4. Apparatus as set forth in claim 3, wherein said gear means includes a ring gear on the upper member, said element defining a spur gear in mesh with the ring gear.

5. Apparatus as set forth in claim 3, wherein said gear means includes a ring gear on the lower member, said element defining a spur gear in mesh with the ring gear.

6. Apparatus as set forth in claim 1, wherein said upper member includes an annular flange, said element coupling means including a vertical bar and means for mounting the bar on the flange, said element having means for rotatably mounting the element on the bar intermediate the ends thereof.

7. Apparatus as set forth in claim 6, wherein said mounting means includes a horizontal shaft secured to and extending laterally from said bar, said element being rotatable on said shaft.

8. Apparatus as set forth in claim 6, wherein said upper member has an annular flange thereon, said element coupling means including a roller on said bar near the upper end thereof, said roller being supported on and in rolling relationship to said flange.

9. Apparatus as set forth in claim 1, wherein said upper member has a lower surface, said support surface for the upper member being adjacent to the lower surface of said upper member.

10. Apparatus as set forth in claim 9, wherein said support means of said upper member includes a plurality of spaced devices defining upper support surfaces below the lower surface of the upper member.

11. Apparatus as set forth in claim 10, wherein each device includes a plurality of rollers, and means mounting the rollers on the upper member near the outer periphery thereof.

12. Apparatus as set forth in claim 11, wherein said roller mounting means includes an annular band.

13. Apparatus as set forth in claim 10, wherein the devices move with said upper member and said element.

14. Apparatus as set forth in claim 1, wherein is included means coupling the lower member to the support to permit rotation of the support relative to the lower member as the lower member is supported from beneath by the coupling means.

15. Apparatus as set forth in claim 1, wherein is included a pair of conduits, there being a rotatable element for each conduit, respectively, the elements being spaced from each other radially with reference to the first axis, the conduits being movable onto and off each member along concentric paths.

16. Apparatus as set forth in claim 1, wherein is included a third member spaced above the upper member and adapted to be coupled to said support, there being a second roller element between said upper and third members, said second roller element being coupled to the third element for movement therewith about the first axis, said conduit having a length sufficient to allow the conduit to move from a position in which the conduit extends about the upper and third member to a position in which the conduit extends about the lower and upper members as a function of the movement of the support in one direction.

* * * * *